UNITED STATES PATENT OFFICE.

LUDWIG BRUMLEU, OF HOBOKEN, NEW JERSEY.

IMPROVEMENT IN THE MODE OF MAKING OXYCHLORIDE OF LEAD.

Specification forming part of Letters Patent No. 29,665, dated August 21, 1860.

*To all whom it may concern:*

Be it known that I, LUDWIG BRUMLEU, of the city of Hoboken, Hudson county, State of New Jersey, have invented a new and Improved Mode of Manufacturing White Oxychloride of Lead; and I do hereby declare that the following is a full and exact description thereof, reference being had to the accompanying samples of said white oxychloride of lead.

To enable others skilled in the art to make and use my invention, I will proceed to describe the mode of manufacturing the same, which has to be divided into two preparatory operations—first, the chloride of lead; second, the oxychloride of lead.

The process of manufacturing white oxychloride of lead is based upon the fact that chloride of lead and subacetate of lead decompose each other and alter their respective proportions, so that the chloride of lead is formed into the oxychloride of lead by combining with the superabundant oxide of lead contained in the subacetate of lead, and the subacetate of lead is formed into the acetate of lead.

To facilitate the process of making acetate of lead and subacetate of lead, metallic lead is melted and passed through a perforated vessel or sieve into water, forming a fine lead wire, by which process the metallic lead is divided into as much surface as possible to be exposed to the action of the acid and the atmosphere, as hereinafter described. In this state the lead wire is placed into tubs about five feet diameter and two feet deep, arranged in tiers, so that liquid in the upper tier empties by a faucet into the second tier, thence into the third tier, and thence into a separate vessel for further treatment. These tubs containing the lead wire are then filled full with diluted acetic acid or a weak solution of sugar of lead. The acetic acid may be of a strength that one ounce will neutralize twenty grains of carbonate of potash, or the sugar of lead in solution of about one hundred pounds in two hundred gallons of water. After the acetic acid or the solution of sugar of lead has remained on the lead wire contained in the upper tier of tubs for a few minutes, it is then drawn off onto the lead wire in the second tier of tubs and retained a few minutes. Then it is drawn off onto the lead wire in the third tier of tubs and retained a few minutes, and thence drawn off into a separate vessel for further use. Thus, after the action of the acetic acid or the solution of sugar of lead, the lead wire contained in said tubs is fully exposed to the action of the atmosphere, causing the lead wire to oxidize on its surface and forming a crust of white oxide of lead on said lead wire. Then by refilling said tubs with acetic acid, as before stated, the said oxide of lead formed on the surface of the lead wire will be rapidly disolved. The acetic acid may then be drawn off as quick as possible, by which process the remaining lead wire in said tubs will be exposed to the action of the atmosphere and oxidize, causing the formation of white oxide of lead. The same process may be repeated until all the lead wire contained in said tubs is reduced or formed into white oxide of lead. The tubs may then be refilled with lead wire, &c., and the same process continued over and over again.

To perform this process expeditiously it is obvious, in the first place, to obtain as much surface as possible by dividing the metallic lead into wire, to facilitate the action of the acetic acid on said lead wire. Then the acetic acid is drawn off rapidly to allow the action of the atmosphere on the lead wire in order to facilitate the formation of white oxide of lead, as before described.

When the metallic lead, by the aforesaid process, has been prepared and deposited in said tubs, the process of making white oxychloride of lead is divided into two branches.

First. To make acetate of lead for the formation of the chloride of lead, a portion of said tubs containing the lead wire are filled with acetic acid, which, after remaining a few minutes, forms acetate of lead, and is drawn off, as before described, into a separate vessel to be treated with muriatic acid under continued agitation in said vessel. The muriatic acid during said process will combine with the lead contained in the acetate of lead, forming chloride of lead, which will settle to the bottom of said vessel, leaving the vinegar or acetic acid nearly free, which may then be drawn off, ready to be used over and over again for a similar process, leaving the chloride of lead to be used for the production or the formation of white oxychloride of lead, as hereinafter described in the second process.

Second. To make subacetate of lead for the formation of white oxychloride of lead, the second division of said tubs containing lead wire and intended for this process are then filled with liquid acetate of lead and reduced to a strong subacetate of lead, and then drawn off into a separate vessel, and there, under continued agitation, the said chloride of lead is introduced into the said subacetate of lead. During this process the chloride of lead will combine with the oxide of lead contained in the subacetate of lead and will form white oxychloride of lead until the subacetate of lead will be reconverted into acetate of lead, which is then drawn off and may be used over and over again on lead wire in said tubs, forming subacetate of lead to be used for making oxychloride of lead, as hereinbefore described, until by waste or loss the acetate of lead is reduced and has then to be replaced with fresh acetic acid or acetate of lead. The acetate of lead may be tested with litmus-paper at any time during said process. The white oxychloride of lead thus produced will then settle to the bottom of said vessel, and may then be prepared for use by washing, drying, and packing for market.

The subacetate of lead may also be made by dissolving litharge in acetic acid, and many other alterations or modifications from the foregoing description may be introduced without departing from the spirit of my invention; nor is it possible to give the exact proportions, because the materials used always vary in quality.

The number and size of the tubs in each tier or division, &c., may be increased or diminished in size to suit the locality or the idea of the manufacturer, &c.

What I claim as my invention, and desire to secure by Letters Patent, is as follows:

The process, as set forth in the foregoing description, of manufacturing oxychloride of lead from chloride of lead and subacetate of lead, leaving in solution neutral acetate of lead free to be used over and over for the same purpose.

LUDWIG BRUMLEU.

In presence of—
HENRY WHINFIELD,
JOSEPH CATE.